United States Patent Office 3,298,784
Patented Jan. 17, 1967

3,298,784
PREPARATION OF HEXABORANE(10)
William V. Hough, Valencia, Pa., assignor to Callery Chemical Company, Pittsburgh, Pa., a corporation of Pennsylvania
No Drawing. Filed Jan. 23, 1959, Ser. No. 788,510
8 Claims. (Cl. 23—204)

This invention relates to a new method of preparing hexaborane(10), $B_6H_{10}$, and more particularly to its preparation from pentaborane(11), $B_5H_{11}$ in the presence of a catalyst.

Since the boron hydrides have very high heats of combustion they are useful as high energy fuels, particularly for use in bipropellant rockets, as is disclosed for example by Malina and Parsons, U.S. 2,573,471. Hexaborane(10) is particularly suited for such application because of its high heat of combustion, liquid physical state, stability, and resistance to hydrolysis. Hexaborane(10) is formed as a minor decompositon product of tetraborane(10) or pentaborane(11), and has been prepared in macroscopic amounts from the decomposition of magnesium boride with acid, but this method is difficult to reproduce consistently.

According to this invention hexaborane(10) is prepared by contacting pentaborane(11) and certain weak Lewis base catalysts according to the overall equation $$2B_5H_{11} \xrightarrow{\text{catalyst}} B_6H_{10} + 2B_2H_6$$

According to the Lewis acid-base theory, a base is any molecule, ion, or radical which is capable of donating an electron pair to an electron acceptor or acid. We have found that all ethers, thioethers, and those tertiary amines and hydrocarbon substituted phosphines which are weak Lewis bases are satisfactory catalysts for use in this reaction. For the purposes of this invention weak Lewis bases are defined as those bases which do not form a stable borane adduct, $XBH_3$, where X is the base, from reaction of the base and diborane at room temperature. Suitable basic reactants include, for example, alkyl ethers such as dimethyl ether and diethyl ether, cyclic ethers such as tetrahydropyran and tetrahydrofuran, polyethers such as diethylene glycol dimethyl ether, thioethers such as dimethylsulfide and thiophene, tertiary amines such as phenyldimethylamine and tri - iso - butylamine and phosphines such as triphenylphosphine. Strong bases such as the lower alkyl tertiary amines, cyclic tertiary amines and lower trialkylphosphines are not suitable as catalysts.

The following example is illustrative of the practice of this invention. Tetrahydrofuran, 2.36 mmols (millimols), and pentaborane(11), 2.56 mmols, were mixed at —80° C. under an inert gas blanket in a reaction bulb which was connected to a series of two U tube condensers, the first maintained at —80° C. and the second at —196° C. The reaction mixture was warmed to and maintained at —23° C. for 1 hour and then warmed to and maintained at 0° C. for 1 hour. During this period a vacuum was applied to the system which pumped the volatile material from the reaction bulb through the condensers. The —196° C. fraction contained diborane and some tetraborane; the —80° C. fraction contained tetrahydrofuran, hexaborane(10), and some pentaborane(11) and pentaborane(9). The two fractions were further separated by low temperature vacuum fractionation and yielded the following amounts of borane products: 1.04 mmols of $B_6H_{10}$, 0.48 mmol of $B_5H_9$, 0.08 mmol of $B_5H_{11}$, 0.20 mmol of $B_4H_{10}$, and 2.09 mmols of $B_2H_6$. Thus 97% of the pentaborane(11) had reacted, and an 84% yield of hexaborane(10) was recovered based on the above equation. The pentaborane(9) recovered is believed to be produced by the competing normal decomposition of $B_5H_{11}$ according to $$B_5H_{11} \rightarrow B_5H_9 + H_2$$

It is generally preferred to carry out the reaction at a temperature between about —60° C. and 0° C. although the reaction proceeds at temperatures outside this range. At lower temperatures the reaction is very slow as is illustrated by the results set forth in Table I.

TABLE I

*Preparation of hexaborane(10)*

[Reactants: Approximately equimolar mixtures of tetrahydrofuran and $B_5H_{11}$]

| Temp. | Time | Percent Yield of Hexaborane (10) |
|---|---|---|
| —80 | 216 | 30 |
| —63 | 6 | 35 |
| —45 | 5 | 65 |
| —23 | 1 | 84 |
| 0 | 1 | |

At higher temperatures the yield of hexaborane(10) is less since higher proportions of the pentaborane(11) thermally decompose to give pentaborane(9). Thus for example, at 25° C. for ½ hour, an approximately equimolar charge of tetrahydrofuran and pentaborane(11) gave a 45% yield of hexaborane(10) and approximately an equal amount (mols) of pentaborane(9). A 1 hour reaction at 40° C. gave a yield of 18% hexaborane(10).

Although the reaction proceeds with any proportion of catalyst, substantially higher yields of hexaborane(10) are obtained if the catalyst is present in an amount at least about equimolar with the pentaborane(11). The low volatility of such reaction mixtures indicates that the reaction proceeds through the formation of an intermediate compound or complex, which decomposes or disproportionates to yield hexaborane(10). Thus if at least an equimolar amount of catalyst is used, all the pentaborane(11) is complexed throughout the reaction period. When a lesser amount of catalyst is used only a portion of the pentaborane(11) is complexed; as the complex reacts to yield hexaborane(10) the catalyst is freed to complex additional pentaborane(11). This results in a slower production of hexaborane(10), and further, since a portion of the pentaborane(11) is uncomplexed for a substantial part of the reaction period, the uncomplexed pentaborane(11) may thermally decompose resulting in a loss of yield. For example, a change of 1.10 mmols of tetrahydrofuran and 2.08 mmols of pentaborane(11) at 0° C. for 1 hour gave 0.23 mmol of $B_6H_{10}$, a yield of 21%, and 0.50 mmol of pentaborane(9).

The reaction proceeds more satisfactorily at subatmospheric pressure than at higher pressure. This is consistent with the concept of the dissociation or disproportionation of an intermediate compound as dissociation producing volatile materials proceeds at a more rapid rate at lower pressures.

Other weak Lewis base catalysts act to produce hexaborane(10) from pentaborane(11) in the same manner as described above. Thus, for example, an equimolar mixture of dimethyl ether and pentaborane(11) reacted at —23° C. for 1 hour produced an 82% yield of hexaborane(10). Dimethyl ether is particularly desirable; because of its low boiling point it is more easily fractionated from the hexaborane(10) product than less volatile bases.

It is convenient to mix the reactants at a temperature below which any rapid reaction occurs and to subsequently warm the mixture to reaction temperature. The reactants may, however, be mixed at reaction temperature without detriment.

In order to prevent the formation of explosive mixtures of the borane with air, the reactions should be performed in the absence of air. This is most conveniently done by the use of an inert cover gas such as nitrogen or argon.

According to the provisions of the patent statutes, I have explained the principle and mode of practicing my invention having described what I now consider to be its best embodiments. However, I desire to have it understood that, within the scope of the appended claims, the invention may be practiced otherwise than as specifically described.

I claim:
1. A method of preparing hexaborane(10) which comprises the step of contacting pentaborane(11) and a Lewis base which will not form a borane adduct with diborane at room temperature and is selected from the class consisting of alkyl ethers, cyclic ethers, liquid polyethers, thioethers, tertiary amines and hydrocarbon substituted phosphines, in proportions of at least about 0.52 mole of Lewis base for each mole of pentaborane(11), and recovering the hexaborane(10) produced thereby.

2. A method of preparing hexaborane(10) which comprises the steps of contacting pentaborane(11) and a Lewis base which will not form a borane adduct with diborane at room temperature and is selected from the class consisting of alkyl ethers, cyclic ethers, liquid polyethers, thioethers, tertiary amines and hydrocarbon substituted phosphines, in substantially equimolar proportions, at subatmospheric pressure and a temperature between about $-60°$ C. and $0°$ C., and recovering the hexaborane(10) produced thereby.

3. A method according to claim 2 in which the Lewis base is dimethyl ether.

4. A method according to claim 2 in which the Lewis base is tetrahydrofuran.

5. A method according to claim 2 in which the Lewis base is tetrahydropyran.

6. A process for preparing hexaborane, $B_6H_{10}$, which comprises initially admixing, at a temperature up to about the reaction temperature of the reactants, $B_5H_{11}$ and an ether in equimolar proportions and thereafter maintaining the reactants at a temperature at which they react and form hexaborane, said ether being selected from the group consisting of dimethyl ether, diethyl ether, tetrahydrofuran, tetrahydropyran, and diethylene glycol dimethyl ether.

7. A method according to claim 6 in which the reaction temperature is between about $-60°$ C. and $0°$ C.

8. A method according to claim 6 in which the pressure is subatmospheric.

References Cited by the Examiner
UNITED STATES PATENTS 2,860,167 11/1958 Brown _____ 260—583
3,110,565 11/1963 Boone _____ 23—204

OTHER REFERENCES

Boone et al.: "Journal of the American Chemical Society," vol. 80, pp. 1519–1520 (Mar. 20, 1958).

Curme et al.: "Glycols," 1952, pp. 176–177.

Edwards et al.: "Papers Presented to the Section on Inorganic Chemistry, 16th International Congress of Pure and Applied Chemistry," 1958, pp. 475–481.

Forsyth et al.: Abstracts of Papers, 135th Meeting, American Chemical Society, 1959, p. 40M.

Grant: "Hackh's Chemical Dictionary," 3rd Edition, pp. 174–175.

Hackh et al.: "Hackh's Chemical Dictionary," 2nd Edition, 1937, p. 48.

Klemm et al.: "Fiat Review of German Science," Inorganic Chemistry, Part I, p. 129 (1948).

Schechter et al.: "Boron Hydrides and Related Compounds," prepared by Callery Chem. Co., for Bureau of Aeronautics, Dept. of Navy., printed Jan. 8, 1951, declassified December 1953, p. 29.

Wiberg: "Berichte," vol. 77, pp. 87–89 (Part A), 1944.

OSCAR R. VERTIZ, *Primary Examiner.*

ROGER L. CAMPBELL, MAURICE A. BRINDISI,
*Examiners.*

C. D. QUARFORTH, M. WEISSMAN, H. T. CARTER, *Assistant Examiners.*